(12) United States Patent
Kha

(10) Patent No.: US 9,866,134 B2
(45) Date of Patent: Jan. 9, 2018

(54) CONTROL CIRCUITS AND METHODS FOR REGULATING OUTPUT VOLTAGES USING MULTIPLE AND/OR ADJUSTABLE REFERENCE VOLTAGES

(71) Applicant: Astec International Limited, Kowloon (HK)

(72) Inventor: Kim Ly Kha, Tai Po (HK)

(73) Assignee: ASTEC INTERNATIONAL LIMITED, Kwun Tong, Kowloon (HK)

( * ) Notice: Subject to any disclaimer, the term of this patent is extended or adjusted under 35 U.S.C. 154(b) by 580 days.

(21) Appl. No.: 14/152,280

(22) Filed: Jan. 10, 2014

(65) Prior Publication Data

US 2015/0200598 A1    Jul. 16, 2015

Related U.S. Application Data

(63) Continuation of application No. 14/151,967, filed on Jan. 10, 2014.

(51) Int. Cl.
  *H02M 3/335* (2006.01)
  *H02M 1/00* (2006.01)
  *H02M 1/32* (2007.01)

(52) U.S. Cl.
  CPC ... *H02M 3/33592* (2013.01); *H02M 3/33523* (2013.01); *H02M 2001/0025* (2013.01); *H02M 2001/327* (2013.01); *Y02B 70/1475* (2013.01)

(58) Field of Classification Search
  CPC ....... H02M 3/33523; H02M 2001/327; H02M 2001/0025; H02M 3/33592

(Continued)

(56) References Cited

U.S. PATENT DOCUMENTS

| 7,072,190 B2 | 7/2006 | Schlecht |
| 7,091,874 B2 | 8/2006 | Smithson |

(Continued)

FOREIGN PATENT DOCUMENTS

| CN | 101394132 | 3/2009 |
| CN | 103036420 | 4/2013 |

(Continued)

OTHER PUBLICATIONS

"Intelligent Energy Management for Improved Efficiency," Ericsson, Jun. 2010, pp. 1-12.

*Primary Examiner* — Adolf Berhane
*Assistant Examiner* — Afework Demisse
(74) *Attorney, Agent, or Firm* — Harness, Dickey & Pierce, P.L.C.

(57) ABSTRACT

Methods of regulating an output voltage of a switched mode power supply having a variable input voltage and a power switch include adjusting a reference voltage to adjust a duty cycle of a control signal for the power switch. The reference voltage may be adjusted as a function of the duty cycle, in response to the duty cycle of the control signal being outside a defined range and/or in the response to a temperature within the switched mode power supply being above a threshold temperature. Other methods include selecting a reference voltage from a plurality of reference voltages based on a determined input voltage and generating a control signal for the power switch as a function of the selected reference voltage to adjust the duty cycle of the control signal. Switched mode power supplies and control circuits for implementing the methods are also disclosed.

17 Claims, 7 Drawing Sheets

(58) Field of Classification Search
USPC .......................................................... 363/17
See application file for complete search history.

(56) References Cited

U.S. PATENT DOCUMENTS

| | | |
|---|---|---|
| 7,269,034 B2 | 9/2007 | Schlecht |
| 7,272,021 B2 | 9/2007 | Schlecht et al. |
| 7,453,709 B2 | 11/2008 | Park et al. |
| 7,502,236 B2 | 3/2009 | Baurle et al. |
| 7,558,083 B2 | 7/2009 | Schlecht |
| 7,564,702 B2 | 7/2009 | Schlecht |
| 7,787,261 B2 | 8/2010 | Farrington et al. |
| 8,149,597 B2 | 4/2012 | Farrington et al. |
| 8,193,790 B2 * | 6/2012 | Asuncion .............. H02M 3/156 323/282 |
| 8,493,751 B2 | 7/2013 | Schlecht |
| 2004/0207532 A1 * | 10/2004 | Smithson ................ G08B 5/38 340/643 |
| 2010/0289467 A1 | 11/2010 | Wu et al. |
| 2011/0187396 A1 * | 8/2011 | Jarrige ............... G01R 31/3008 324/750.3 |
| 2013/0202061 A1 | 8/2013 | Chandrasekaran |
| 2014/0015330 A1 * | 1/2014 | Byun ..................... H02J 5/005 307/104 |
| 2015/0115717 A1 | 4/2015 | Horng et al. |

FOREIGN PATENT DOCUMENTS

| | | |
|---|---|---|
| CN | 103108441 A | 5/2013 |
| CN | 103163928 | 6/2013 |
| CN | 204790658 U | 11/2015 |
| WO | 2009/059527 | 5/2009 |
| WO | 2012/116750 | 9/2012 |
| WO | 2012/143050 | 10/2012 |
| WO | 2013/113354 | 8/2013 |
| WO | 2013/156079 | 10/2013 |

* cited by examiner

CONTROL CIRCUITS AND METHODS FOR REGULATING OUTPUT VOLTAGES USING MULTIPLE AND/OR ADJUSTABLE REFERENCE VOLTAGES

CROSS-REFERENCE TO RELATED APPLICATION

This application is a continuation of U.S. patent application Ser. No. 14/151,967 filed Jan. 10, 2014. The entire disclosure of the above application is incorporated herein by reference.

FIELD

The present disclosure relates to control circuits and methods for regulating output voltages using multiple and/or adjustable reference voltages.

BACKGROUND

This section provides background information related to the present disclosure which is not necessarily prior art.

Switched mode power supplies commonly include power switches and one or more pulse width modulated (PWM) control signals for controlling the power switches. The output voltage of such power supplies may be regulated by comparing output voltage feedback information with a reference voltage and, based on this comparison, adjusting the ON time duration (i.e., duty cycle) of the power switches.

SUMMARY

This section provides a general summary of the disclosure, and is not a comprehensive disclosure of its full scope or all of its features.

According to one aspect of the present disclosure, a method of regulating an output voltage of a switched mode power supply having a variable input voltage and at least one power switch is provided. The method includes generating a control signal for the at least one power switch using a reference voltage. The control signal has a duty cycle. The method further includes determining if the duty cycle of the control signal is within a defined range and in response to determining the duty cycle of the control signal is outside the defined range, adjusting the reference voltage to adjust the duty cycle of the control signal for the at least one power switch of the switched mode power supply.

According to another aspect of the present disclosure, a control circuit is provided for regulating an output voltage of a switched mode power supply having a variable input voltage and at least one power switch. The control circuit is operable to generate a control signal for the at least one power switch using a reference voltage. The control signal has a duty cycle. The control circuit is also operable to determine if the duty cycle of the control signal is within a defined range and in response to determining the duty cycle of the control signal is outside the defined range, adjusting the reference voltage to adjust the duty cycle of the control signal for the at least one power switch of the switched mode power supply.

According to yet another aspect of the present disclosure, a method of regulating an output voltage of a switched mode power supply having a variable input voltage and at least one power switch is provided. The method includes generating a control signal for the at least one power switch using a reference voltage. The control signal has a duty cycle. The method further includes adjusting the reference voltage to adjust the duty cycle of the control signal for the at least one power switch of the switched mode power supply. Adjusting the reference voltage includes adjusting the reference voltage as a function of the duty cycle of the control signal.

According to another aspect of the present disclosure, a method of regulating an output voltage of a switched mode power supply having a variable input voltage and at least one power switch is provided. The method includes determining the input voltage, selecting a reference voltage from a plurality of reference voltages based on the determined input voltage and generating a control signal for the at least one power switch of the switched mode power supply as a function of the selected reference voltage to adjust a duty cycle of the control signal for the at least one power switch of the switched mode power supply.

According to yet another aspect of the present disclosure, a control circuit is provided for regulating an output voltage of a switched mode power supply having a variable input voltage and at least one power switch. The control circuit is operable to determine the input voltage, select a reference voltage from a plurality of reference voltages based on the determined input voltage and generate a control signal for the at least one power switch of the switched mode power supply as a function of the selected reference voltage to adjust a duty cycle of the control signal for the at least one power switch of the switched mode power supply.

According to another aspect of the present disclosure, a method of regulating an output voltage of a switched mode power supply having a variable input voltage and at least one power switch is provided. The method includes generating a control signal for the at least one power switch using a reference voltage. The control signal has a duty cycle. The method further includes determining if a temperature within the switched mode power supply is above a threshold temperature and in response to determining the temperature is above the threshold temperature, adjusting the reference voltage to adjust the duty cycle of the control signal for the at least one power switch of the switched mode power supply.

According to yet another aspect of the present disclosure, a control circuit is provided for regulating an output voltage of a switched mode power supply having a variable input voltage and at least one power switch. The control circuit is operable to generate a control signal for the at least one power switch using a reference voltage. The control signal has a duty cycle. The control circuit is also operable to determine if a temperature within the switched mode power supply is above a threshold temperature and in response to determining the temperature is above the threshold temperature, adjust the reference voltage to adjust the duty cycle of the control signal for the at least one power switch of the switched mode power supply.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
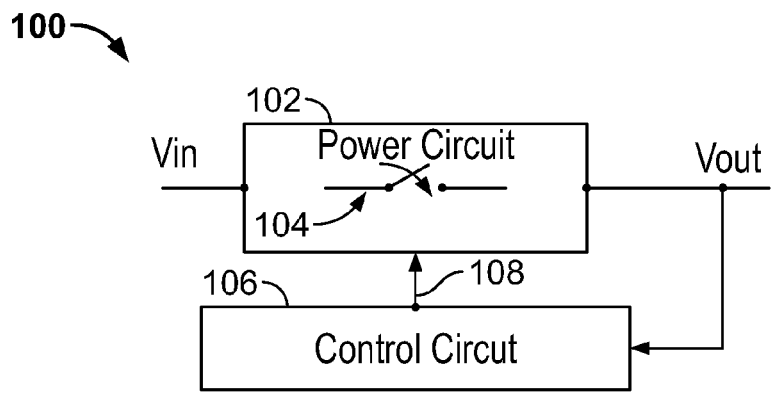
FIG. 1 is a block diagram of a switched mode power supply including a power circuit and a control circuit according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, a method of regulating an output voltage of a switched mode power supply (SMPS) having a variable input voltage and at least one power switch is disclosed. The method includes generating a control signal having a duty cycle for the at least one power switch using a reference voltage and adjusting the reference voltage to adjust the duty cycle of the control signal for the at least one power switch of the SMPS. The reference voltage is a function of the duty cycle of the control signal.

By changing the reference voltage, the duty cycle for the control signal may be adjusted to operate the SMPS at a sufficiency high efficiency (e.g., substantially 97%). Thus, regardless of variation in the input voltage, the SMPS may operate at a high efficiency while having its output regulated.

The above method of regulating an output voltage may be implemented by any suitable control circuit including, for example, the control circuits disclosed herein. For example, FIG. 1 illustrates a SMPS 100 including a power circuit 102 having a power switch 104 and a control circuit 106 operable to perform the method disclosed herein and/or other methods if applicable. Thus, the control circuit 106 may generate a control signal 108 for the power switch 104 using a reference voltage, determine if a duty cycle of the control signal 108 is within a defined range, and in response to determining the duty cycle of the control signal is outside the defined range, adjust the reference voltage to adjust the duty cycle of the control signal 108 provided to the power switch 104.

In some embodiments, the output voltage of a SMPS having a variable input voltage and a power switch may be regulated by generating a control signal having a duty cycle for the at least one power switch using a reference voltage and determining if the duty cycle of the control signal is within a defined range. In response to determining the duty cycle of the control signal is outside the defined range, the output voltage may be regulated by adjusting the reference voltage to adjust the duty cycle of the control signal for the at least one power switch of the SMPS.

The defined range may correspond to a duty cycle region which allows the SMPS to operate at high efficiency. For example, and as further explained below, by changing the reference voltage, the duty cycle may be adjusted so that it remains within the defined range a substantial amount of time.

In some examples, the defined range may include at least one endpoint. For example, one endpoint of the defined range may be a maximum duty cycle (Dmax) and another endpoint of the defined range may be a minimum duty cycle (Dmin). Thus, if the duty cycle of the control signal is below the Dmin or above the Dmax, the reference voltage may be changed to adjust the duty cycle so that the duty cycle is forced back into the defined range.

If, however, the duty cycle of the control signal is within the defined range, the reference voltage may remain substantially unchanged.

In some examples, adjusting the reference voltage includes adjusting the reference voltage as a function of an average duty cycle of the defined range. For example, the defined range may include an average duty cycle based on the Dmax and the Dmin (e.g., Davg=(Dmax+Dmin)/2). Thus, if the duty cycle of the control signal is below the Dmin, the reference voltage may change to a new reference voltage (e.g., Vrefnew=Vref*Davg/D). As a result, the new reference voltage is centered at an operating duty cycle substantially equal to the Davg.

Alternatively, if the duty cycle of the control signal is above the Dmax, the reference voltage may be reduced until the duty cycle substantially equals the Davg. In some preferred embodiments, the reference voltage is gradually reduced until the duty cycle substantially equals the Davg. Alternatively, the reference voltage may immediately change if desired. In other embodiments, the reference voltage may be reduced by calculating a new reference voltage (e.g., Vrefnew=Vref*Davg/D) as explained above.

Additionally and/or alternatively, adjusting the reference voltage may include adjusting the reference voltage as a function of a sensed output current (Iout) and/or as a function of a change in duty cycle (ΔD) from a no load condition to a maximum load condition (e.g., Ioutmax). For example, if the duty cycle is below the Dmin or above the Dmax, the reference voltage may change to a new reference voltage Vrefnew=Vref*Dnew/D, where Dnew is determined by the following equation:

$$D\text{new} = D\text{avg} - (\Delta D/2) + (\Delta D * I\text{out}/I\text{outmax}). \quad (1)$$

Thus, for example, if the duty cycle is above the Dmax, the reference voltage may be reduced thereby changing the duty cycle to a value below the Dmax.

Additionally and/or alternatively, adjusting the reference voltage may include adjusting the reference voltage so that the duty cycle is closer to one of the endpoints. Thus, the reference voltage may be adjusted so that the duty cycle is closer to either the Dmax or the Dmin.

For example, if it is desired to make the duty cycle closer to the Dmax and the duty cycle is currently below the Dmin, the reference voltage may change to a new reference voltage Vrefnew=Vref*Dnew/D, where Dnew is determined by the following equation:

$$D\text{new} = (D\text{max} - 1) - (\Delta D * I\text{out}/I\text{outmax}). \quad (2)$$

Alternatively, if the duty cycle is above the Dmax, the reference voltage may be reduced to a new reference voltage Vrefnew=Vref*Dnew/D, where Dnew is determined by the following equation:

$$D\text{new} = (D\text{avg} + 1) + (\Delta D * I\text{out}/I\text{outmax}). \quad (3)$$

Further, equation (3) above can be simplified as follows: Dnew=(Davg)+(ΔD*Iout/Ioutmax), provided (Dmax−Dmin)>2*(ΔD*Iout/Ioutmax). Thus, in the above example, the reference voltage may be adjusted to change the duty cycle so that it is closer to the Dmax.

Additionally, the Dmin, the Dmax, the Davg, the ΔD, etc. may be defined values at startup. Similarly, the reference voltage may be a defined value at startup of the SMPS and then adjusted if applicable. Alternatively, the reference voltage may not be defined and instead determined after startup of the SMPS. For example, the SMPS may startup with a fixed duty cycle substantially equal to Davg. The reference voltage may then be determined based on the fixed duty cycle or at the end of a soft start. The duty cycle may then change (as explained above) once the output voltage is regulated.

Alternatively, the reference voltage may be determined as a function of the variable input voltage. For example, the reference voltage may be determined by selecting the reference voltage from multiple (e.g., two or more) reference voltages corresponding to multiple (e.g., two or more) voltage ranges. In such cases, each voltage range may be associated with a different reference voltage. Thus, the input voltage of the SMPS may be determined (e.g., sensed, etc.) and the reference voltage may be selected from the references voltages based on which voltage range the input voltage falls within.

The reference voltages corresponding to the voltage ranges may be stored in, for example, a control circuit, etc. Thus, the reference voltage may be selected from the stored reference voltages.

If the reference voltage is determined as a function of the variable input voltage as explained above, the reference voltage may be changed (as explained above) to adjust the duty cycle of the control signal which is provided to the power switch of the SMPS.

In some embodiments, the voltage ranges may include only noncontiguous ranges. In such circumstances, the noncontiguous ranges may assist in reducing hysteresis. Alternatively, the voltage ranges may include only contiguous ranges, some contiguous ranges and some noncontiguous ranges, etc.

The above methods of regulating an output voltage in response to determining if the duty cycle is outside a defined range may be implemented by any suitable control circuit including, for example, the control circuits disclosed herein. For example, FIGS. 2-5 illustrate example power supplies including the power circuit 102 having a power switch (not shown) and a control circuit operable to perform the method disclosed above and/or other methods (e.g., disclosed herein) if applicable.

Figure 2:
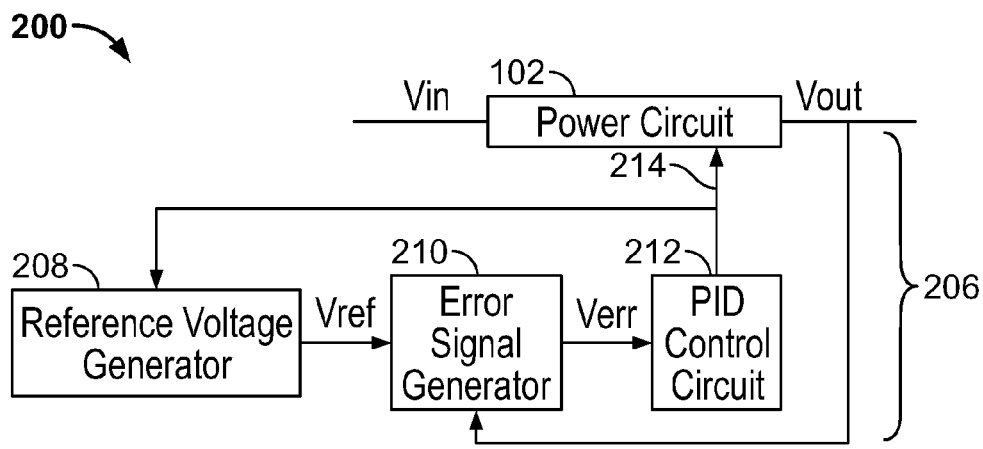
FIG. 2 is a block diagram of a switched mode power supply including a power circuit and a control circuit for regulating an output voltage in response to determining if a duty cycle is outside a defined range according to another example embodiment.

FIG. 2 illustrates a SMPS 200 including a control circuit 206 having a reference voltage generator 208, an error signal generator 210 and a proportional-integral-derivative (PID) control circuit 212. The reference voltage generator 208 receives a duty cycle (via the control signal 214) and outputs a reference voltage Vref to the error signal generator 210. The error signal generator 210 compares the reference voltage Vref with the output voltage Vout to generate an error signal Verr based on the difference between the reference voltage Vref and the output voltage Vout. The PID control circuit 212 may calculate a new duty cycle for the control signal 212 based on the error signal Verr to control the power switch(es) of the power circuit 102. Alternatively, the control circuit 206 may include one or more other control components in addition to or in place of the PID control circuit 212 for calculating the new duty cycle, generating the control signal 214, etc.

Figure 3:
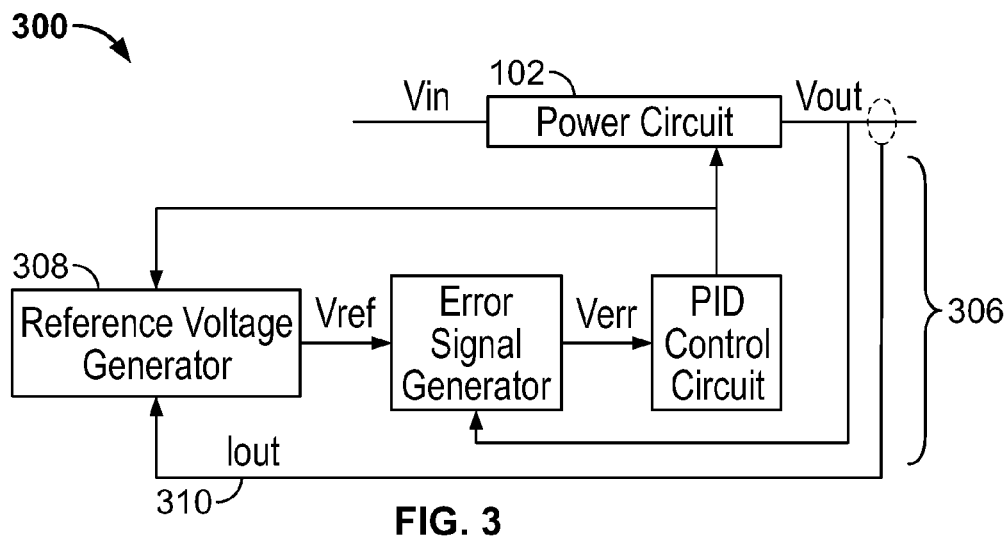
FIG. 3 is a block diagram of a switched mode power supply including a power circuit and a control circuit for adjusting a reference voltage as a function of an output current according to yet another example embodiment.

FIG. 3 illustrates a SMPS 300 including a control circuit 306 having a reference voltage generator 308. The control circuit 306 is similar to the control circuit 206 of FIG. 2, but includes sensing an output current Iout. For example and as shown in FIG. 3, the reference voltage generator 308 receives a signal 310 representing the output current Iout. Thus, the reference voltage generator 308 may adjust the reference voltage Vref as a function of the sensed output current Iout and/or as a function of a change in duty cycle ($\Delta D$) from a no load condition to a maximum load condition (e.g., Ioutmax) as explained above.

Figure 4:
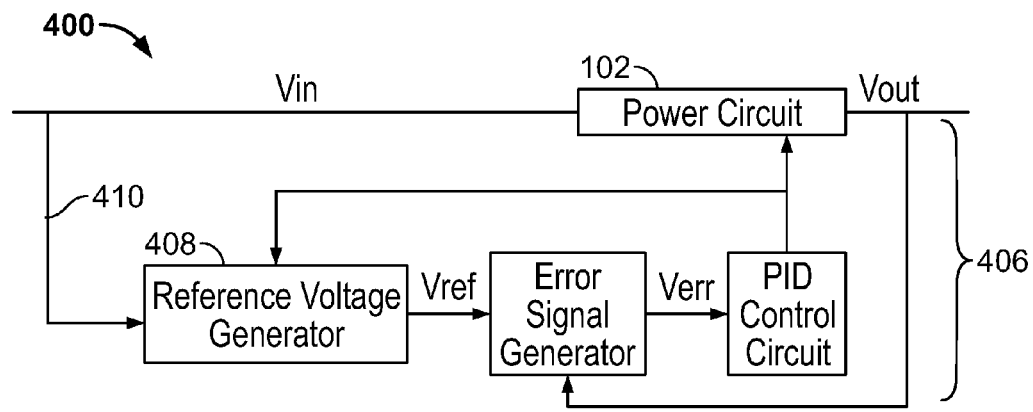
FIG. 4 is a block diagram of a switched mode power supply including a power circuit and a control circuit for selecting and adjusting a reference voltage as a function of an input voltage according to another example embodiment.

FIG. 4 illustrates a SMPS 400 including a control circuit 406 having a reference voltage generator 408. The control circuit 406 is similar to the control circuit 206 of FIG. 2, but includes sensing an input voltage Vin. For example and as shown in FIG. 4, the reference voltage generator 408 receives a signal 410 representing the input voltage Vin. Thus, the reference voltage generator 408 may select the reference voltage Vref, adjust the reference voltage Vref to a new reference voltage (e.g., Vrefnew), etc. as explained above.

Figure 5:
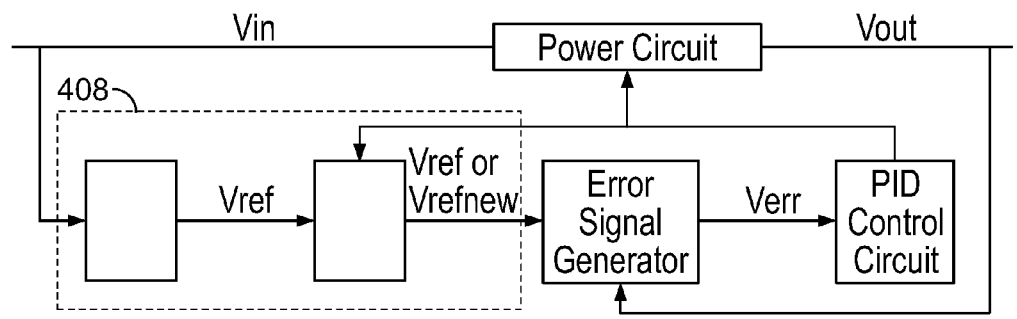
FIG. 5 is a block diagram of the switched mode power supply of FIG. 4 including multiple control circuit components for selecting and adjusting the reference voltage.

In some embodiments, the reference voltage generator 408 of FIG. 4 may include more than one component for generating and/or adjusting the reference voltage. For example, FIG. 5 illustrates the reference voltage generator 408 including a component for receiving the input voltage Vin and selecting the reference voltage Vref (as explained above) and another component for changing the reference voltage (e.g., to Vrefnew) if one of the conditions (e.g., the duty cycle is outside the defined range, etc.) is met as explained above. Thus and as shown in FIG. 5, the reference voltage generator 408 may output the reference voltage Vref or a new reference voltage Vrefnew.

In other example embodiments, the output voltage of a SMPS having a variable input voltage and one or more power switches may be regulated by generating a control signal having a duty cycle for the power switches using a reference voltage and determining if a temperature within the SMPS is above a threshold temperature. In response to determining the temperature is above the threshold temperature, the output voltage may be regulated by adjusting the reference voltage to adjust the duty cycle of the control signal for the power switches of the SMPS.

The temperature may be determined, for example, by sensing one or more operating temperatures within the SMPS. Alternatively, the temperature within the SMPS may be determined in another suitable manner.

Additionally, in some preferred embodiments, the output voltage of the SMPS may be regulated for a shorter period of time than the period of time the temperature remains constant. Alternatively, the output voltage of the SMPS may be regulated for another suitable period of time.

In some examples, the adjusted reference voltage may be calculated as a function of a defined duty cycle. For example, the defined duty cycle may be an optimum duty cycle (Dopt) where conversion power loss is minimized in the SMPS. In some cases, the optimum duty cycle (Dopt) may be between the Dmax and the Dmin (as explained above).

Additionally, the output voltage of the SMPS may be regulated by determining the duty cycle of the control signal in addition to the temperature within the SMPS as explained above. For example, if the temperature is less than the threshold temperature and the duty cycle is less than the Dmax or more than Dmin (as explained above), the reference voltage may remain substantially unchanged.

If, however, the temperature is less than the threshold temperature and the duty cycle is more than the Dmax, or less than the Dmin, the reference voltage may be reduced or increased to a new reference voltage (Vrefnew) determined by the following equation:

$$Vrefnew=Vref*Dopt/D). \qquad (4)$$

Therefore, as shown in equation (4), the reference voltage may be adjusted as a function of the optimum duty cycle (Dopt).

Similarly, if the temperature is above the threshold temperature (as explained above), the reference voltage may be adjusted (e.g., increased, etc.) to a new reference voltage determined by equation 4 above.

In other embodiments, if the temperature continues to rise, the optimum duty cycle (Dopt) may become a fixed value until the temperature falls. For example, if the temperature rises above a second threshold temperature higher than the threshold temperature noted above, the new reference voltage calculated in equation (4) above may be determined based on a fixed optimum duty cycle (Dopt) until the temperature falls below the lower threshold temperature. After the temperature falls below the lower threshold temperature, the control process may operate as explained above.

Additionally and as explained above, the reference voltage (e.g., at startup), the Dmin, the Dmax, etc. may be defined values. Similarly, the threshold temperatures may be defined values. Alternatively, the reference voltage may be determined as a function of the variable input voltage as explained above.

For example, if the reference voltage is determined as a function of the variable input voltage, the reference voltage may be adjusted if the temperature within the SMPS is above the threshold temperature according to equation (4) above. Alternatively, if the temperature within the SMPS is below the threshold temperature, the reference voltage may not change.

The above methods of regulating an output voltage in response to determining if a temperature within a SMPS is above a threshold temperature may be implemented by any suitable control circuit including, for example, the control circuits disclosed herein. For example, FIGS. 6-8 illustrate example power supplies including the power circuit 102 having a power switch (not shown) and a control circuit operable to perform the method disclosed above and/or other methods (e.g., disclosed herein) if applicable.

Figure 6:
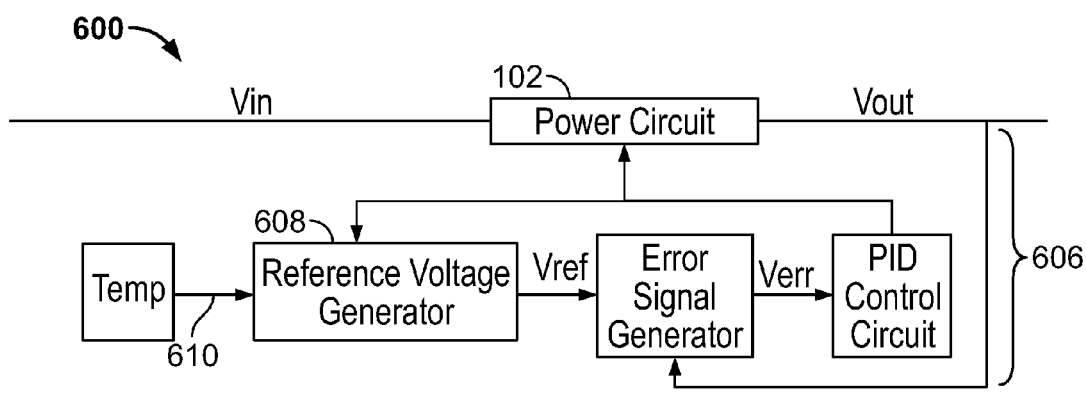
FIG. 6 is a block diagram of a switched mode power supply including a power circuit and a control circuit for adjusting a reference voltage based on a temperature within the switched mode power supply according to another example embodiment.

FIG. 6 illustrates an example SMPS 600 including a control circuit 606 having a reference voltage generator 608. The control circuit 606 is similar to the control circuit 206 of FIG. 2. The control circuit 606, however, senses a temperature within the SMPS 600. For example and as shown in FIG. 6, the reference voltage generator 608 receives a signal 610 representing the temperature within the SMPS 600. Thus, the reference voltage generator 608 may change the reference voltage Vref to adjust the duty cycle of the control signal for the power switch of the SMPS 600 based on the temperature within the SMPS 600 as explained above.

Figure 7:
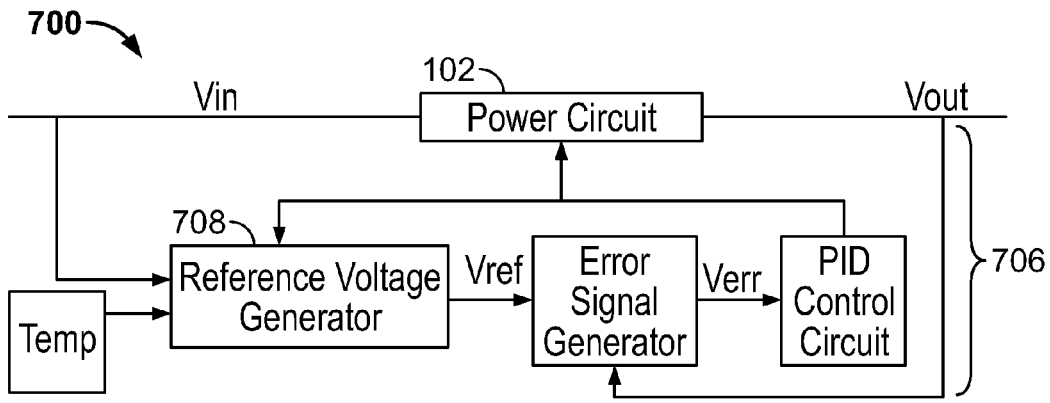
FIG. 7 is a block diagram of a switched mode power supply including a power circuit and a control circuit for selecting and adjusting a reference voltage as a function of an input voltage and a temperature within the switched mode power supply according to yet another example embodiment.

FIG. 7 illustrates a SMPS 700 including a control circuit 706 having a reference voltage generator 708. The control circuit 706 is similar to the control circuit 406 of FIG. 4. The control circuit 706, however, senses the temperature within the SMPS 700 as explained above. Thus, the reference voltage generator 708 may select the reference voltage Vref (e.g., based on the input voltage), adjust the reference voltage Vref to a new reference voltage (e.g., Vrefnew), etc. as explained above.

Figure 8:
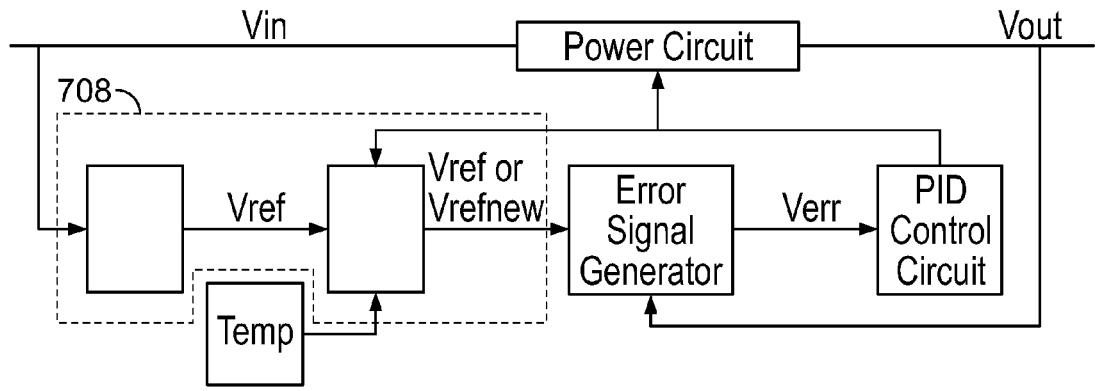
FIG. 8 is a block diagram of the switched mode power supply of FIG. 7 including multiple control circuit components for selecting and adjusting the reference voltage.

FIG. 8 illustrates the reference voltage generator 708 of FIG. 7 including a component for receiving the input voltage Vin and selecting the reference voltage Vref (as explained above) and another component for changing the reference voltage (e.g., to Vrefnew) if one of the conditions (e.g., the temperature is above a threshold temperature, the duty cycle is outside the defined range, etc.) is met as explained above. Thus and as shown in FIG. 8, the reference voltage generator 708 may output the reference voltage Vref or a new reference voltage Vrefnew.

In other example embodiments, the output voltage of a SMPS having a variable input voltage and one or more power switches may be regulated by determining the input voltage, selecting a reference voltage from multiple reference voltages based on the determined input voltage, and generating a control signal for the power switches of the SMPS as a function of the selected reference voltage to adjust a duty cycle of the control signal.

The reference voltage may be selected from multiple reference voltages based on the determined input voltage as explained above. For example, the reference voltage may be determined by selecting the reference voltage from multiple reference voltages corresponding to multiple voltage ranges as explained above.

In some examples, generating the control signal may include determining whether the variable input voltage falls within a defined range. In response to determining the variable input voltage falls outside the defined range, the control signal may be generated by calculating a new reference voltage based on the selected reference voltage to adjust the duty cycle of the control signal for the power switch.

The defined range may be any suitable range of voltages. For example, the defined range may be about 36V to about 40V. After the reference voltage is selected (e.g., based on the input voltage), a new reference voltage may be calculated based on the selected reference voltage if the input voltage is between 36V to 40V. The new reference voltage may be calculated by equation (4) explained above. As a result of calculating a new reference voltage, the duty cycle of the control signal may be further optimized when the input voltage is within the defined range.

Alternatively, generating the control signal may include determining whether a sensed temperature is greater than a defined threshold temperature as explained above. In response to determining the sensed temperature is greater than the defined threshold temperature, the control signal may be generated by calculating a new reference voltage based on the selected reference voltage to adjust the duty cycle of the control signal for the power switch. In such cases, the new reference voltage may be calculated based on equation (4) explained above.

In some examples, generating the control signal may include determining if the duty cycle of the control signal is within a defined range as explained above. In response to determining the duty cycle of the control signal is outside the defined range, the control signal may be generated by calculating a new reference voltage based on the selected reference voltage to adjust the duty cycle of the control signal.

In such examples, the new reference voltage may be calculated as a function of the average duty cycle Davg of the defined range if the duty cycle is less than the minimum duty cycle Dmin as explained above. Alternatively, the new reference voltage may be calculated so that the duty cycle substantially equals the average duty cycle Davg if the duty cycle is greater than the maximum duty cycle Dmax as explained above.

In other examples, the new reference voltage may be calculated as a function of a defined duty cycle. For example, the new reference voltage may be calculated as a function of the optimum duty cycle (Dopt) as explained above with reference to equation (4).

The above methods of regulating an output voltage in response to selecting a reference voltage based on the determined input voltage may be implemented by any suitable control circuit including, for example, the control circuits disclosed herein. For example, the control circuits explained above with reference to FIGS. 4, 5, 7 and 8 may be employed.

Figure 9:
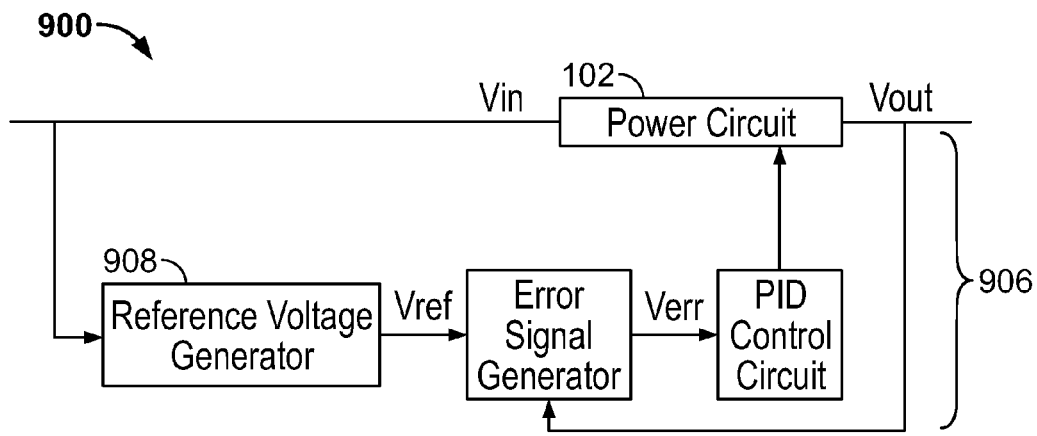
FIG. 9 is a block diagram of a switched mode power supply including a power circuit and a control circuit for selecting and adjusting a reference voltage as a function of an input voltage according to another example embodiment.

Additionally, FIG. 9 illustrates another example SMPS 900 including a control circuit 906 that may be employed. As shown in FIG. 9, the SMPS 900 includes the power circuit 102 having a power switch (not shown) and the control circuit 906 operable to perform the method disclosed above and/or other methods (e.g., disclosed herein) if applicable.

The control circuit 906 of FIG. 9 is similar to the control circuit 406 of FIG. 4. As shown in FIG. 9, however, the control circuit 906 includes a reference voltage generator 908 that does not receive the duty cycle of a control signal provided to the power switch of the power circuit 102. Instead, the reference voltage generator 908 selects (and then outputs) a reference voltage Vref based on a sensed input voltage Vin. As explained above, the reference voltage may be selected from stored reference voltages corresponding to voltage ranges.

Figure 10:
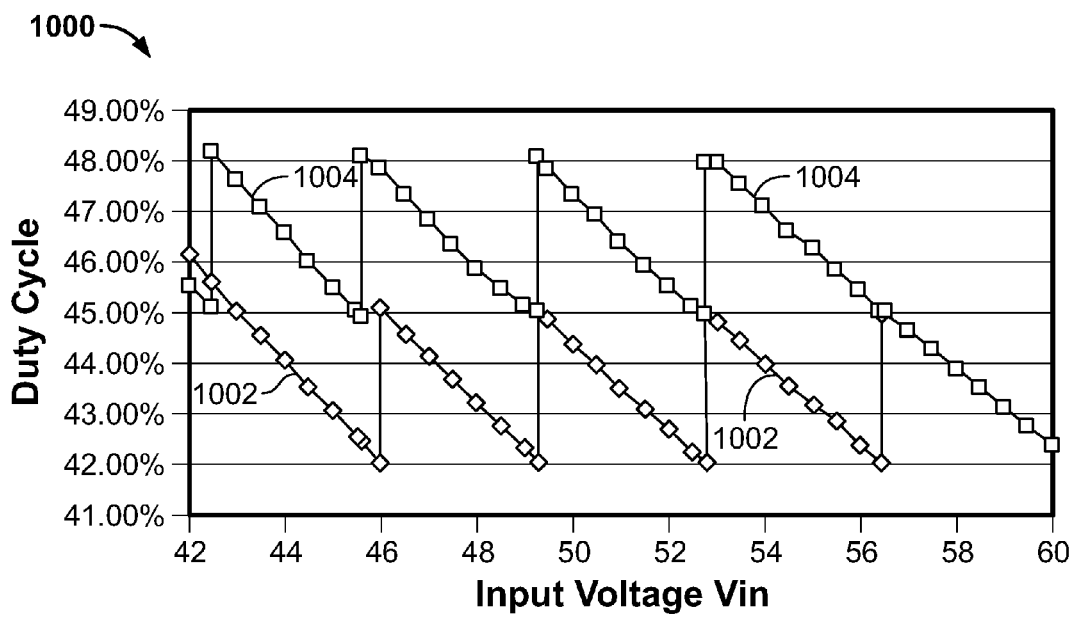
FIG. 10 is a graph including a duty cycle of a control signal corresponding to a variable input voltage and a 12.5 A load current according to yet another example embodiment.
Figure 11:
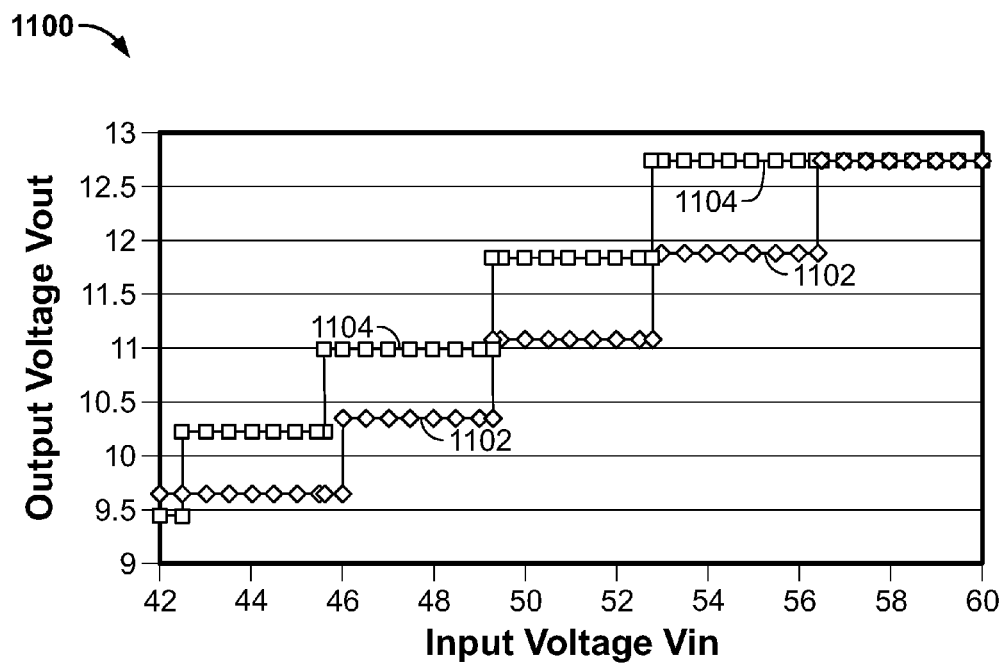
FIG. 11 is a graph including a regulated output voltage corresponding to a variable input voltage and a 12.5 A load current according to another example embodiment.

FIGS. 10 and 11 illustrate example graphs of a duty cycle of a control signal and an output voltage of a SMPS including a control circuit to determine if the duty cycle is outside a defined range as explained above. FIG. 10 is an example graph 1000 illustrating the duty cycle based on an input voltage Vin of the power circuit according to a load current of 12.5 A. In the example of FIG. 10, the defined range of the duty cycle (as explained above) may include a Dmin of 42%, a Dmax of 48%, and a Davg of 45% while the defined reference voltage may be initially set to 9V. As shown in FIG. 10, the line 1002 represents the duty cycle as the input voltage Vin increases from 42V to 60V while line 1004 represents the duty cycle as the input voltage Vin decreases from 60V to 42V.

FIG. 11 is an example graph 1100 illustrating the output voltage Vout based on the input voltage Vin of the power circuit according to the load current of 12.5 A. As shown in FIG. 11, the output voltage Vout (represented by line 1102) is substantially regulated at about 9.7V, about 10.4V, about 11.1V, about 11.8V and about 12.75V as the input voltage Vin increases from 42V to 60V. Additionally, when the input voltage Vin decreases from 60V to 42V, the output voltage Vout (represented by line 1104) is substantially regulated at about 9.4V, about 10.25V, about 11V, about 11.8V and about 12.75V.

Figure 12:
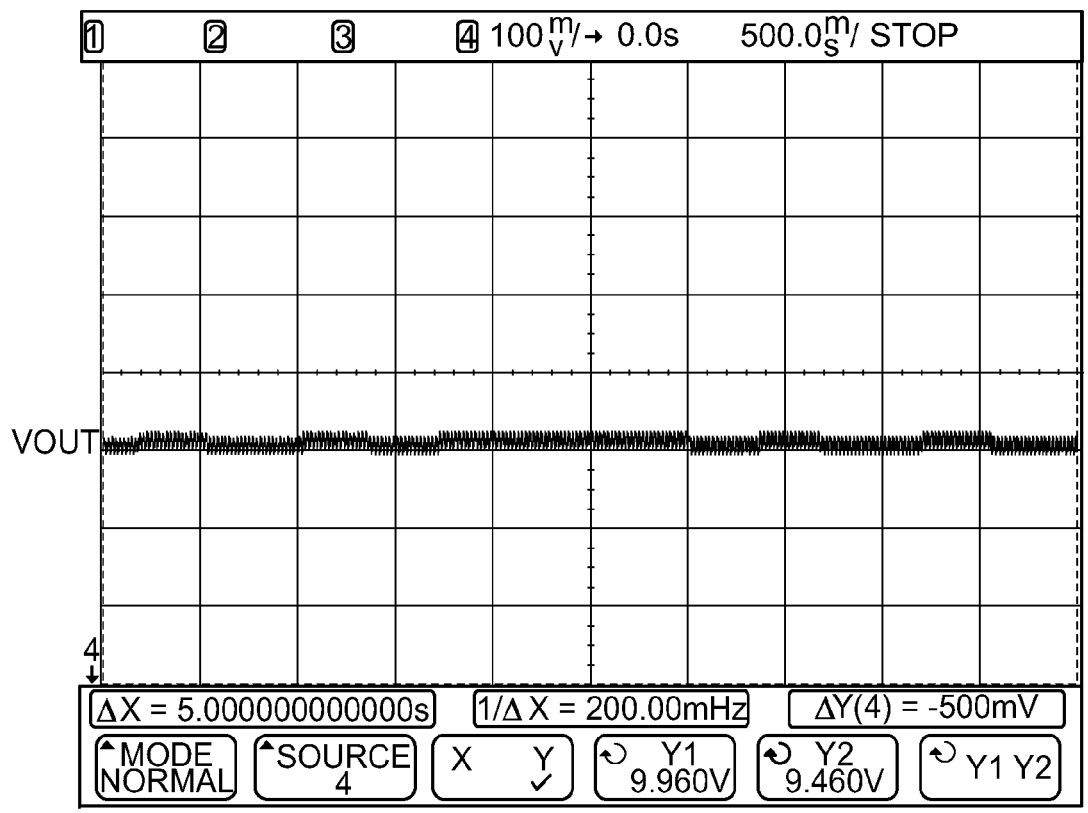
FIG. 12 is a graph including a regulated output voltage of a power circuit for a transient load changing from 0 A to 50 A according to yet another example embodiment.
Figure 13:
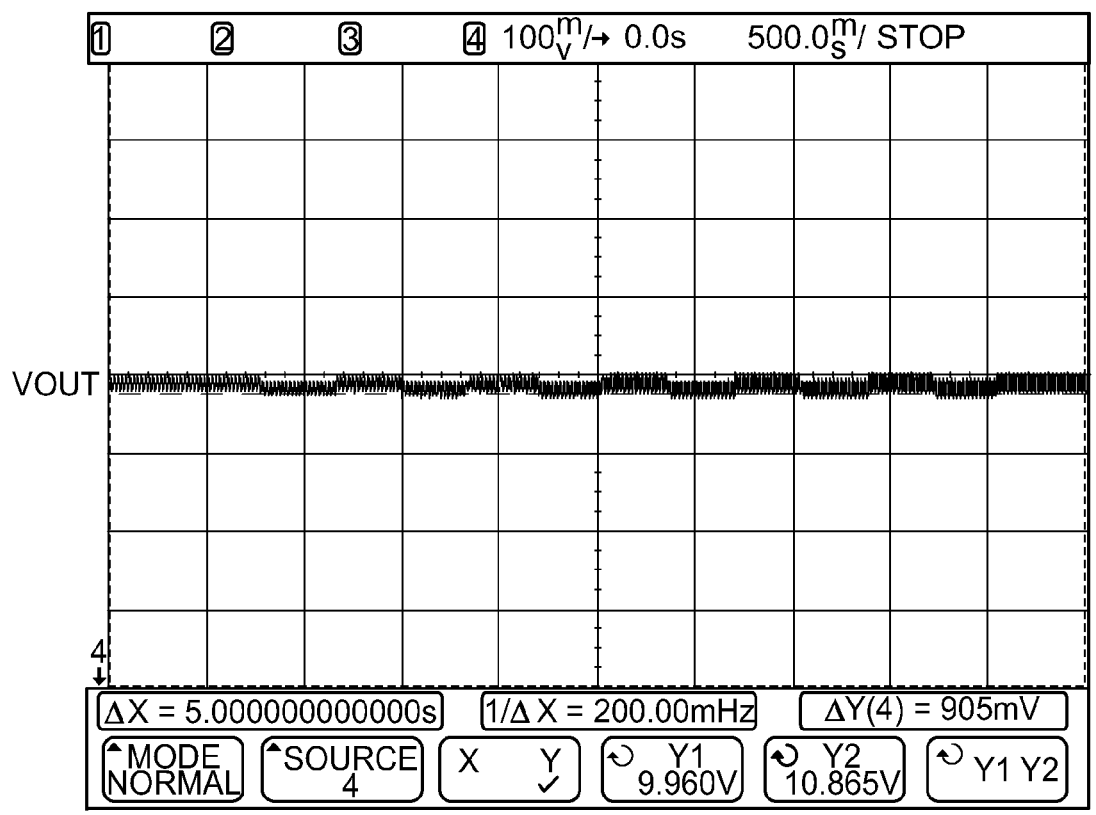
FIG. 13 is a graph including a regulated output voltage of a power circuit for a transient load changing from 50 A to 0 A according to another example embodiment.

FIGS. 12 and 13 illustrate example graphs of the regulated output voltage Vout for a transient load based on a defined range of a duty cycle as explained above. For example, the graph of FIG. 12 illustrates the regulated output voltage Vout for a transient load changing from 0 A to 50 A while the graph of FIG. 13 illustrates the regulated output voltage Vout for a transient load changing from 50 A to 0 A.

Figure 14:
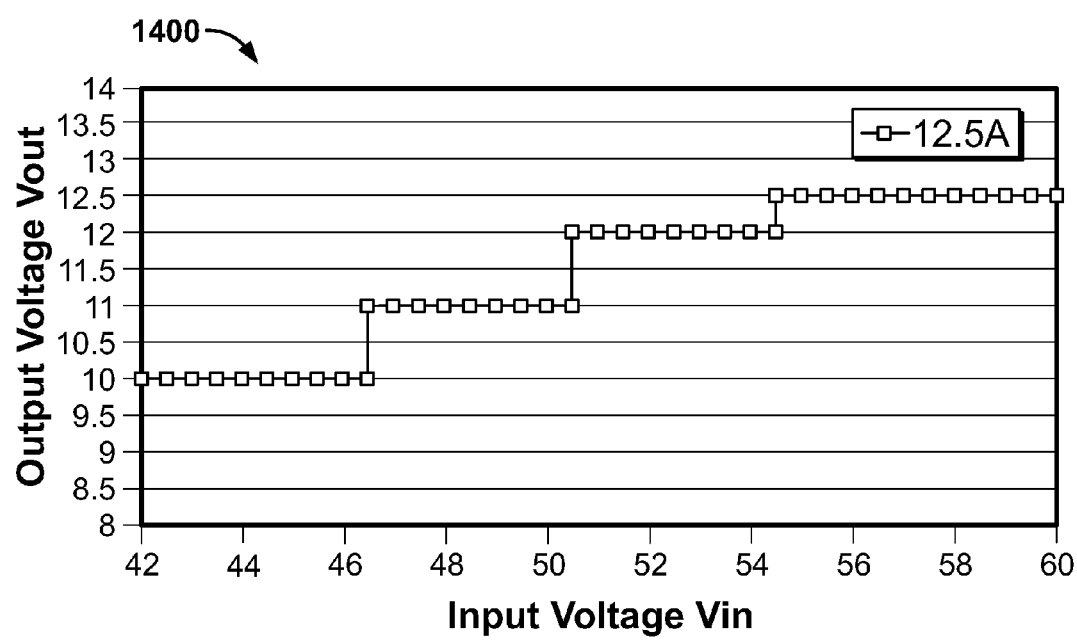
FIG. 14 is a graph including a regulated output voltage corresponding to a variable input voltage and a 12.5 A load current according to yet another example embodiment.

FIG. 14 is an example graph 1400 illustrating the output voltage Vout based on the input voltage Vin of a SMPS according to the load current of 12.5 A. In the example of FIG. 14, the SMPS includes a control circuit for selecting a reference voltage from multiple reference voltages based on a determined input voltage as explained above. As shown in FIG. 14, the output voltage Vout is substantially regulated at about 10V, about 11V, about 12V and about 12.5V as the input voltage Vin is varies (e.g., between 42V and 60V).

Figure 15:
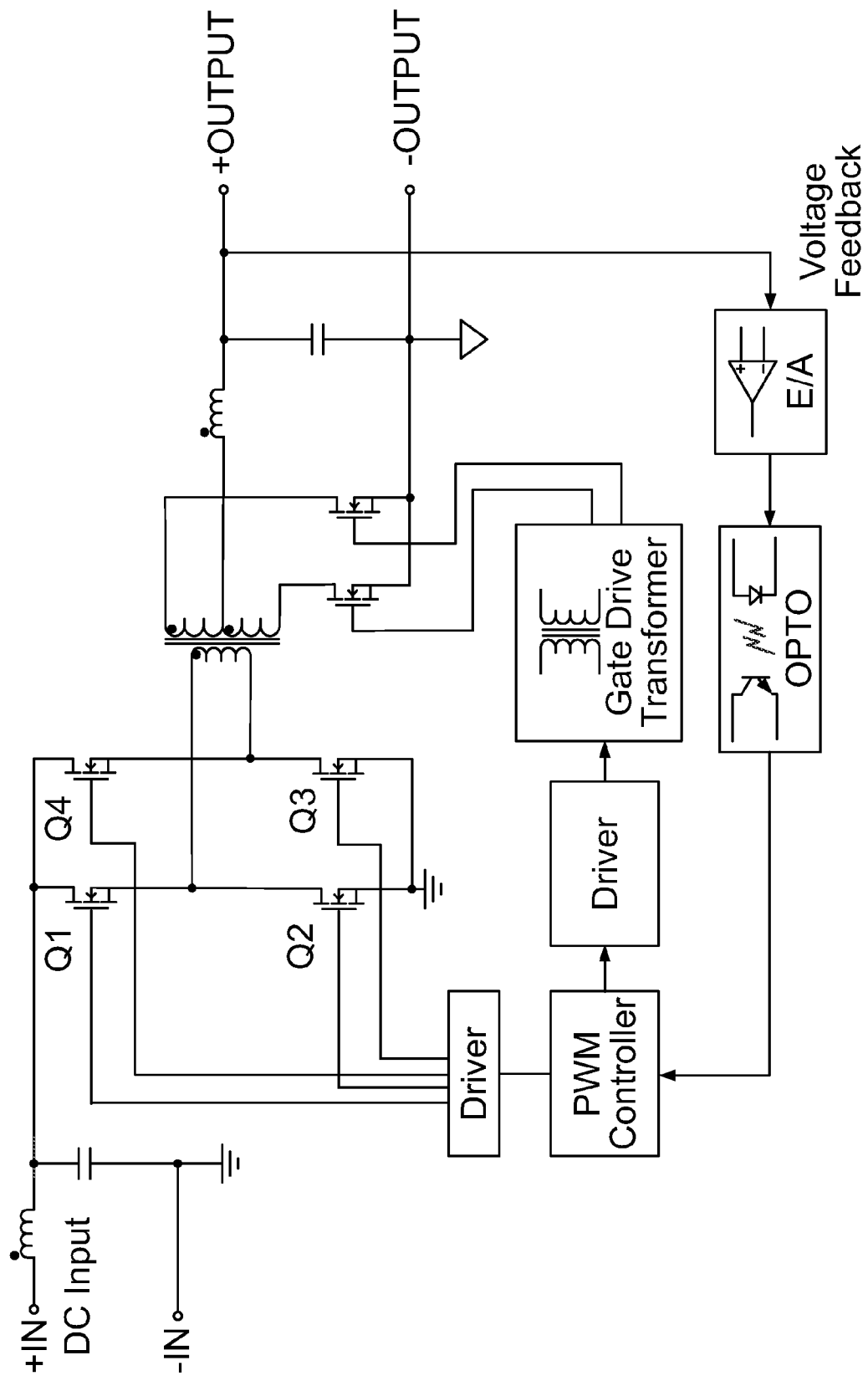
FIG. 15 is schematic diagram of an isolated forward converter employable in the power circuits of FIGS. 1-9.

The power circuits disclosed herein may include any suitable DC-DC switching converter topology including, for example, a flyback converter, a forward converter, a buck converter, a boost converter, a bridge converter (e.g., full bridge, half bridge, etc.), a resonant converter (e.g., an LLC converter, etc.), etc. For example, FIG. 15 illustrates a power circuit including an isolated forward converter having power switches Q1, Q2, Q3, Q4 coupled to an isolation transformer. Alternatively, the power circuits may include a non-isolated converter topology. Additionally, the power circuits may be employed as an intermediate bus converter.

The control circuits disclosed herein may include an analog control circuit, a digital control circuit (e.g., a digital signal processor (DSP), a microprocessor, a microcontroller, etc.), or a hybrid control circuit (e.g., a digital control circuit and an analog control circuit). Thus, the methods disclosed herein may be performed by a digital controller. Additionally, the entire control circuit, some of the control circuit, or none of the control circuit may be an integrated circuit (IC).

The control circuits may be on the secondary side of an isolation barrier if, for example, the power circuit includes an isolation transformer. In such cases, the control signal may cross the isolation barrier (e.g., via an isolation transformer, an opto-coupler, etc.) to control power switches on the primary side of the power circuit.

In addition, the methods disclosed herein may be repeated as desired. For example, the control circuits may be able to successively perform the methods as desired and/or if applicable.

By changing the reference voltage and the duty cycle as needed, the output voltage of the SMPS may be regulated regardless of changes in the input voltage of the power circuit. Thus, in some cases, the output voltage may be regulated without sensing or otherwise determining the input voltage. This may result in an increased power density of the SMPS. For example, in the example embodiments not detecting the input voltage, the power density may be increased by not including components to sense or otherwise determine the input voltage. Additionally, this may allow the control circuit to be implemented with less complexity.

Additionally, by employing the control circuits disclosed herein, the SMPS including the power circuits may operate at an optimum duty cycle over a varying range of input voltages including, for example, from 42V to 60V. In some examples, the optimum duty cycle may be a substantially high duty cycle. For example, the isolated forward converter of FIG. 14 operates at a sufficiently high efficiency region when the duty cycle of the control signals to the power switches Q1, Q2, Q3, Q4 is about 100%. Thus, by operating at an optimum duty cycle, the SMPS may operate at a higher efficiency as well as have lower power conversion loss, heat generation, and required cooling energy. Accordingly, a green mode may be achieved.

In addition, because peak currents compared to average currents in the power supplies disclosed herein are low, conduction losses may be minimized. Further, because the power switches disclosed herein are capable of zero voltage switching (ZVS), switching losses may be minimized.

As apparent to those skilled in the art, the various SMPSs described herein may be, for example, DC/DC power converters.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of regulating an output voltage of a switched mode power supply having a variable input voltage and at least one power switch, the method comprising:
generating a control signal for the at least one power switch using a reference voltage, the control signal having a duty cycle;
determining if a temperature within the switched mode power supply is above a threshold temperature; and
in response to determining the temperature is above the threshold temperature, adjusting the reference voltage to adjust the duty cycle of the control signal for the at least one power switch of the switched mode power supply.

2. The method of claim 1 further comprising determining if the duty cycle of the control signal is within a defined range and wherein adjusting the reference voltage includes adjusting the reference voltage to adjust the duty cycle of the control signal for the at least one power switch of the switched mode power supply in response to determining the duty cycle of the control signal is outside the defined range.

3. The method of claim 2 wherein the defined range includes a maximum duty cycle and a minimum duty cycle and wherein adjusting the reference voltage includes adjusting the reference voltage as a function of a defined duty cycle if the temperature is less than the threshold temperature and the duty cycle is greater than the maximum duty cycle.

4. The method of claim 1 wherein the adjusted reference voltage is calculated as a function of a defined duty cycle.

5. The method of claim 1 wherein the reference voltage is a function of the input voltage.

6. A control circuit for regulating an output voltage of a switched mode power supply having a variable input voltage and at least one power switch, the control circuit operable to generate a control signal for the at least one power switch using a reference voltage, the control signal having a duty cycle, determine if a temperature within the switched mode power supply is above a threshold temperature, and in response to determining the temperature is above the threshold temperature, adjust the reference voltage to adjust the duty cycle of the control signal for the at least one power switch of the switched mode power supply.

7. The control circuit of claim 6 wherein the control circuit is operable to determine if the duty cycle of the control signal is within a defined range and adjust the reference voltage to adjust the duty cycle of the control signal for the at least one power switch of the switched mode power supply in response to determining the duty cycle of the control signal is outside the defined range.

8. The control circuit of claim 7 wherein the defined range includes a maximum duty cycle and a minimum duty cycle and wherein the control circuit is operable to adjust the reference voltage as a function of a defined duty cycle if the temperature is less than the threshold temperature and the duty cycle is greater than the maximum duty cycle.

9. The control circuit of claim 7 wherein the adjusted reference voltage is calculated as a function of a defined duty cycle.

10. The control circuit of claim 6 wherein the control circuit is operable to sense the input voltage and wherein the control circuit is operable to determine the reference voltage as a function of the sensed input voltage prior to adjusting the reference voltage in response to determining the temperature is above the threshold temperature.

11. The control circuit of claim 10 wherein the control circuit is operable to determine the reference voltage based on whether the sensed input voltage falls within one of a plurality of voltage ranges, each voltage range associated with a different reference voltage.

12. The control circuit of claim 11 wherein the plurality of voltage ranges are noncontiguous ranges.

13. The control circuit of claim 6 wherein the control circuit comprises a digital controller.

14. A control circuit of claim 13 wherein the control circuit includes a proportional-integral-derivative (PID) control circuit.

15. A switched mode power supply having a variable input voltage and including a power circuit having at least one power switch, and the control circuit of claim 6.

16. The switched mode power supply of claim 15 wherein the power circuit includes a forward converter.

17. The switched mode power supply of claim 15 wherein the power circuit includes an isolation transformer.

* * * * *